United States Patent
Duval et al.

(10) Patent No.: US 8,499,623 B2
(45) Date of Patent: Aug. 6, 2013

(54) ABNORMAL COMBUSTION DETECTION METHOD FOR INTERNAL-COMBUSTION ENGINES FROM COMBUSTION INDICATOR DISTRIBUTION MODELLING

(75) Inventors: Laurent Duval, Nanterre (FR); Alexandre Pagot, Rueil Malmaison (FR); Benoist Thirouard, Rueil Malmaison (FR); Jean-Marc Zaccardi, Rueil Malmaison (FR)

(73) Assignee: IFP Energies Nouvelles, Rueil-Malmaison Cedex (FR)

( * ) Notice: Subject to any disclaimer, the term of this patent is extended or adjusted under 35 U.S.C. 154(b) by 458 days.

(21) Appl. No.: 12/917,633

(22) Filed: Nov. 2, 2010

(65) Prior Publication Data
US 2011/0118953 A1    May 19, 2011

(30) Foreign Application Priority Data
Nov. 13, 2009 (FR) ..................................... 09 05463

(51) Int. Cl.
*G01M 15/08* (2006.01)
(52) U.S. Cl.
USPC ..................................... 73/114.02; 73/35.01
(58) Field of Classification Search
USPC ........ 73/35.01, 35.03, 35.06, 114.02, 114.03, 73/114.07
See application file for complete search history.

(56) References Cited

U.S. PATENT DOCUMENTS

| 8,068,972 B2 * | 11/2011 | Auclair et al. | ................. 701/107 |
| 8,359,909 B2 * | 1/2013 | Duval et al. | ................. 73/114.16 |
| 2002/0179053 A1 | 12/2002 | Kokubo et al. | |
| 2007/0016387 A1 | 1/2007 | Takemura et al. | |
| 2007/0084266 A1 | 4/2007 | Kaneko et al. | |
| 2008/0035129 A1 | 2/2008 | Vangraefschepe et al. | |
| 2008/0051975 A1 * | 2/2008 | Ker et al. | ....................... 701/102 |
| 2008/0234918 A1 | 9/2008 | Kaneko et al. | |
| 2010/0077992 A1 * | 4/2010 | Auclair et al. | ................. 123/435 |
| 2011/0113869 A1 * | 5/2011 | Duval et al. | ................. 73/114.16 |
| 2013/0024087 A1 * | 1/2013 | Duval et al. | ................... 701/102 |

FOREIGN PATENT DOCUMENTS

| DE | 40 15 992 A1 | 11/1991 |
| FR | 2 897 900 | 8/2007 |
| WO | WO 2007/001064 A1 | 1/2007 |

* cited by examiner

*Primary Examiner* — Eric S McCall
(74) *Attorney, Agent, or Firm* — Antonelli, Terry, Stout & Kraus, LLP.

(57) ABSTRACT

An abnormal combustion detection method for spark-ignition internal-combustion engines, from combustion indicator distribution modelling is disclosed. At least one combustion indicator such as CA10 is determined. The distribution of N values of this indicator, acquired over N cycles preceding the cycle in progress, is modelled by determining coefficients of a theoretical distribution law. Modelling is repeated by removing extreme values from among the N values or for various working points of the engine, to obtain an evolution of the coefficients. At least one parameter characterizing evolution of at least one of these coefficients is determined. The start of an abnormal combustion is detected by comparing the parameter with a predetermined threshold, and the course of the abnormal combustion detected in the combustion chamber is controlled.

32 Claims, 10 Drawing Sheets

ABNORMAL COMBUSTION DETECTION METHOD FOR INTERNAL-COMBUSTION ENGINES FROM COMBUSTION INDICATOR DISTRIBUTION MODELLING

CROSS REFERENCE TO RELATED APPLICATION

Reference is made to copending U.S. Ser. No. 12/917,650, filed concurrently herewith, entitled "Abnormal Combustion Detection Method for Internal-Combustion Engines from Several Combustion Indicators".

BACKGROUND OF THE INVENTION

1. Field of the Invention

The present invention relates to control of combustion in an internal-combustion engine. The present invention notably relates to a method for detecting an abnormal combustion, of pre-ignition type at low speed and high load, in a combustion chamber of such an engine, and particularly relates, but not exclusively, to such a method applied to a downsized spark-ignition engine running at very high loads.

2. Description of the Prior Art

Spark-ignition engines have the advantage of limiting local emissions (HC, CO and $NO_x$) thanks to the excellent match between the operating mode (at fuel/air ratio 1) and their simple and low-cost post-treatment system. Despite this essential advantage, these engines are badly positioned in terms of greenhouse gas emissions because Diesel engines with which they compete with, can reach 20% less $CO_2$ emissions on average.

The combination of downsizing and supercharging is one of the solutions that have become increasingly widespread for lowering the consumption of spark-ignition engines. Unfortunately, the conventional combustion mechanism in these engines can be disturbed by abnormal combustions. This type of engine includes at least one cylinder comprising a combustion chamber defined by the inner lateral wall of the cylinder, by the top of the piston that slides in the cylinder and by the cylinder head. Generally, a fuel mixture is contained in this combustion chamber and it undergoes compression, then combustion under the effect of a spark ignition, by a spark plug. These stages are grouped together under the term "combustion stage" in the rest of the description.

It has been observed that this fuel mixture can undergo various combustion types and that these combustion types are the source of different pressure levels, and of mechanical and/or thermal stresses some of which can seriously damage the engine.

The first combustion, referred to as conventional combustion or normal combustion, is the result of the propagation of the combustion of a fuel mixture compressed during a prior engine compression stage. This combustion normally propagates in a flame front from the spark generated at the plug and there is no risk it may damage the engine.

Another combustion type is a knocking combustion resulting from an unwanted self-ignition in the combustion chamber. Thus, after the fuel mixture compression stage, the plug is actuated so as to allow ignition of this fuel mixture. Under the effect of the pressure generated by the piston and of the heat released by the fuel mixture combustion start, a sudden and localized self-ignition of part of the compressed fuel mixture occurs before the flame front resulting from the ignition of the fuel mixture by the spark plug comes near. This mechanism, referred to as engine knock, leads to a local pressure and temperature increase and it can generate, in case it occurs repeatedly, destructive effects on the engine and mainly on the piston.

Finally, another combustion type is an abnormal combustion due to a pre-ignition of the fuel mixture before the spark plug initiates ignition of the fuel mixture present in the combustion chamber.

This abnormal combustion affects in particular engines that have undergone downsizing. This operation is intended to reduce the size and/or the capacity of the engine while keeping the same power and/or the same torque as conventional engines. Generally, this type of the engine is essentially of gasoline type and it is highly supercharged.

It has been observed that this abnormal combustion occurs at high loads and generally at low engine speeds, when timing of the fuel mixture combustion cannot be optimum because of engine knock. Considering the high pressures and the high temperatures reached in the combustion chamber as a result of supercharging, an abnormal combustion start can occur, sporadically or continuously, well before ignition of the fuel mixture by the spark plug. This combustion is characterized by a first flame propagation phase that occurs too soon in relation to that of a conventional combustion. This propagation phase can be interrupted by a self-ignition involving a large part of the fuel mixture present in the combustion chamber which is much larger than in the case of engine knock.

In cases where this abnormal combustion takes place repeatedly, from engine cycle to engine cycle, and starts from a hot spot of the cylinder for example, it is referred to as "pre-ignition". If this combustion occurs suddenly, in a random and sporadic way, it is referred to as "rumble".

The latter abnormal combustion leads to very high pressure levels (120 to 250 bars) and to a thermal transfer increase that may cause partial or total destruction of the moving elements of the engine, such as the piston or the piston rod. This pre-ignition type is currently a real limit to spark-ignition engine downsizing. It is a very complex phenomenon that can have many origins. Several hypotheses have been mentioned in the literature to explain its appearance, but so far none has been clearly validated. It even rather appears that several of these potential causes occur simultaneously and interact with one another. This interaction, the violence of the phenomenon and its stochastic character make its analysis extremely complicated. Furthermore, all the various studies on the subject come up against the problem of proper identification of these abnormal combustions. It is in fact difficult to say if an engine is more sensitive than another to pre-ignition as long as one cannot reach a decision on the nature of each of the combustions within a given sample.

A method allowing detection and to quantify these abnormal combustions is therefore absolutely essential because it precisely allows establishing this hierarchy and to identify approaches that will enable to improve the design and the adjustments of the engines. This operation is particularly interesting during test bench engine developments.

The general methodology for dealing with these abnormal combustions is diagrammatically shown in FIG. 1, with first a prevention phase (PP) for limiting to the maximum phenomenon appearance risks, then a detection phase (PD) when prevention is not sufficient to avoid the phenomenon, to determine whether it is pertinent to intervene in the very cycle where pre-ignition was detected by means of a corrective phase (PC).

The detection phase comprises a signal acquisition stage, then a signal processing stage allowing detection of the appearance of pre-ignition at high load, to characterize and to quantify it.

EP Patent Application 1,828,737 describes a method for detecting the appearance of pre-ignition at high load, of a rumble type. This method is based on the measurement of a signal relative to the progress of the combustion and a comparison with a threshold signal. The presence of an abnormal combustion of the rumble type in the combustion chamber is detected when the amplitude of the signal significantly exceeds that of the threshold signal. According to this method, the threshold signal corresponds to the amplitude of the signal produced upon knocking combustion or normal (conventional) combustion.

However, according to this method, the achieved detection does not allow action during the detection cycle per se. The corrective actions on this type of pre-ignition can only be carried out after such a phenomenon has occurred, which may seriously harm the engine integrity.

Another method is also described in French Patent 2,897,900. According to this method, action can be taken more rapidly after pre-ignition detection. One can act during the same cycle as the phenomenon detection cycle. The threshold signal is therefore first calculated with a computer, before engine operation and then stored in data charts of the computer referred to as maps.

However, the use of engine maps does not allow detection any time, that is in real time at the start of such a phenomenon. Detection may therefore occur too late. Furthermore, no quantification of the evolution of the phenomenon can be carried out. Thus, the necessity or not of applying a corrective phase is based only on the comparison of two amplitudes at a given time. Now, such a phenomenon may also start, then stop without causing any damage to the engine, and therefore require no corrective phase.

SUMMARY OF THE INVENTION

The invention is an alternative method allowing detection in real time of a pre-ignition phenomenon at high load (of the rumble type), characterization thereof and quantification thereof, with the devices and systems commonly used in engines, to take steps to prevent pre-ignition phenomenon in the next engine operating phases, during the same cycle as the detection cycle. The method is based on combustion state indicators modelling and on an analysis of the evolution of the theoretical law coefficients used for modelling.

The invention thus is a method for controlling the combustion of a spark-ignition internal-combustion engine, wherein an abnormal combustion is detected in a combustion chamber (14) of at least one cylinder (12) of the engine, at least one signal representative of a state of the combustion is recorded by at least one detector in the engine, and at least one indicator of the combustion at each engine cycle is determined from the signal. The method comprises the following stages for each engine cycle:

a—modelling a distribution of N combustion indicator values acquired over N cycles preceding the cycle in progress, by determining coefficients of a theoretical distribution law;
b—repeating the previous stage by removing extreme values from among the N values or repeating the previous stage for various working points of the engine, so as to obtain an evolution of the coefficients;
c—determining at least one parameter characterizing evolution of at least one of the coefficients;
d—detecting a start of an abnormal combustion by comparing the at least one parameter with a predetermined threshold; and
e—controlling a course of the abnormal combustion detected in the combustion chamber.

According to the invention, a threshold can be defined directly from a tolerance on a gross value of coefficients. It is also possible to define a threshold by calculating the first and second derivatives of each coefficient, and maximum and relative variation bounds are fixed for each derivative. It is also possible to determine an average frequency of pre-ignition appearance by analyzing separately each coefficient and by calculating separately an average of predetermined numbers of pre-ignitions by each coefficient.

The signal can be a continuous pressure measurement within the cylinder. The indicator can be the crank angle where 10% of the energy introduced has been released.

Finally, according to the invention, the indicators can be converted to at least one new indicator, for which a distribution of N values acquired over N cycles preceding the cycle in progress exhibits, for normal combustions, a lower dispersion than the non-converted indicators.

BRIEF DESCRIPTION OF THE FIGURES

Other features and advantages of the invention will be clear from reading the description hereafter, with reference to the accompanying figures wherein.

DETAILED DESCRIPTION OF THE INVENTION

Figure 1:
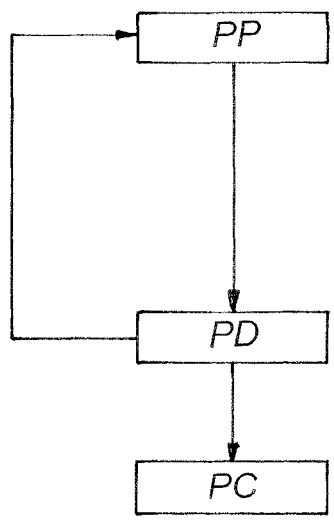
FIG. 1 shows the general methodology for dealing with abnormal combustions of pre-ignition type.
Figure 2:
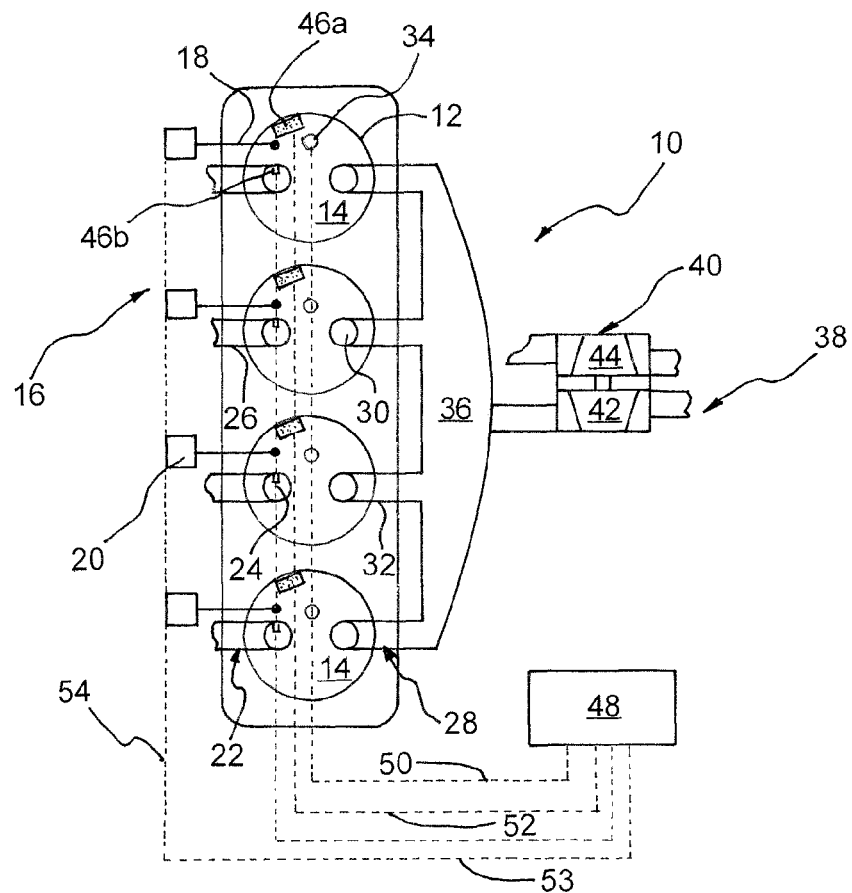
FIG. 2 shows an engine using the detection method according to the invention.

In FIG. 2, a spark-ignition supercharged internal-combustion engine 10, in particular of gasoline type, comprises at least one cylinder 12 with a combustion chamber 14 within which combustion of a mixture of supercharged air and of fuel takes place.

The cylinder comprises at least one means 16 for delivering fuel under pressure, for example in form of a fuel injection nozzle 18 controlled by a valve 20, opening into the combustion chamber, at least one air supply means 22 with a valve 24 associated with an intake pipe 26 ended by a plenum 26b (not shown in the figure), at least one burnt gas exhaust means 28 with a valve 30 and an exhaust pipe 32, and at least one ignition means 34 such as a spark plug that allows generation of one or more sparks allowing the fuel mixture present in the combustion chamber to be ignited.

Pipes 32 of exhaust 28 of this engine are connected to an exhaust manifold 36 itself connected to an exhaust line 38. A supercharging device 40, a turbocompressor for example, is arranged on this exhaust line. In the case of a turbocompressor, the latter comprises a drive stage 42 with a turbine scavenged by the exhaust gas circulating in the exhaust line, and a compression stage 44 allowing intake air under pressure to be fed into combustion chambers 14 through intake pipes 26.

The engine comprises means 46a for measuring the cylinder pressure, arranged within cylinder 12 of the engine. The measuring means generally is a pressure detector for generating a signal representative of the evolution of the pressure in a cylinder.

The engine can also comprise means 46b for measuring the intake pressure, arranged in plenum 26b. The measuring means generally is an absolute pressure detector, of piezoelectric type, for generating a signal representative of the evolution of the intake pressure in the intake plenum.

The engine also comprises a computing and control unit 48 referred to as engine calculator/controller, which is connected by conductors (bidirectional for some of them) to the various elements and detectors of the engine so as to be able to receive the various signals emitted by these detectors, such as the water temperature or the oil temperature, in order to process them and then to control the components of this engine so as to ensure smooth running thereof.

Thus, in the case of the example shown in FIG. 2, spark plugs 34 are connected by conductors 50 to engine controller/calculator 48 to control the ignition time of the fuel mixture, cylinder pressure detector 46a is connected by a line 52 to the engine controller/calculator to send thereto signals representative of the evolution of the pressure in the cylinder, and valves 20 controlling injection nozzles 18 are connected by conductors 54 to calculator 48 to control fuel injection in the combustion chambers. Means 46b are also connected by a line 53 to engine calculator 48.

In such an engine, the method according to the invention allows detection of the appearance of a pre-ignition phenomenon at high load (of the rumble type), to identify and to quantify it. According to an embodiment example, the method comprises the following:

1—measuring pressure in the cylinder and determining therefrom at least one combustion indicator at each engine cycle; then, for each cycle:

2—modelling distributions of N combustion indicator values acquired over N cycles preceding the cycle in progress, by determining coefficients of a theoretical distribution law for various configurations; repeating the modelling by removing extreme values from among the N values or repeating the modelling stage for working points of the engine;

3—determining at least one parameter characterizing an evolution of the coefficients when progressively disregarding extreme values from among the N values, and defining at least one threshold for the parameter by means of said coefficients;

4—detecting the start of an abnormal combustion by comparing the parameter with the threshold; and 5—controlling the course of the abnormal combustion detected in the combustion chamber.

1—Determining a Combustion Indicator at Each Cycle

At least one signal representative of the state of the combustion is recorded by a detector in the engine. According to an embodiment, the cylinder pressure is selected. Measurement of the cylinder pressure is achieved from cylinder pressure measuring device 46a. Instrumentation of the cylinders for pressure measurement has become increasingly common in vehicles.

Then, during each cycle, at least one combustion indicator is calculated from this signal. According to an embodiment, CA10 is selected. CA10 corresponds to the crank angle where 10% of the energy introduced has been released.

2—Modelling the Distribution of N Combustion Indicator Values

Determination of a normal combustion, that is without pre-ignition phenomena, is carried out on-line from N CA10 values calculated over the previous N−1 cycles and the cycle in progress.

A normal combustion, that is without pre-ignition phenomena, is characterized by determining one or more parameters characteristic of the distribution of the N CA10 values calculated over the previous N−1 cycles and the cycle in progress.

According to the invention, these parameters are determined by modelling the distribution of the N CA10 values. This modelling determines the coefficients of a theoretical law allowing best reproduction of observed distribution.

According to a preferred embodiment, various modeilings are performed by disregarding the values referred to as "extreme", by an iterative process.

Figure 3:
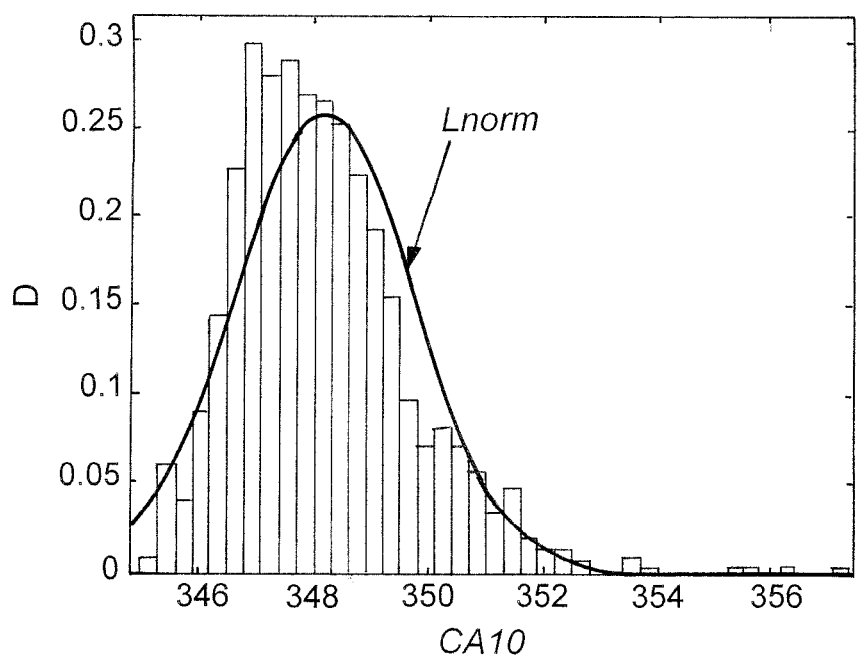
FIG. 3 shows a histogram of CA10 values and a normal law allowing to best adjust to this histogram.

The dispersion from cycle to cycle of the combustion is generally represented by a normal law with which an average is used as a reference for characterizing the behaviour of the engine and a standard deviation that is conventionally used to quantify the observed stability of the quantity. Now, it appears that the conventional standard deviation is not always representative of the stability and that modelling the cyclic dispersion by a normal law is not optimal under certain conditions, as illustrated in FIG. 3. This figure shows the histogram of CA10 values (the ordinate represents density D) and a normal law (Lnorm) allowing best adjustment to this histogram. This combustion instability can be directly felt by the user through ignition misfires for example (driveability and emissions issue), and it can also be linked, in some extreme cases, with abnormal combustions that may lead to engine destruction (problem of pre-ignition at high loads on spark-ignition engines).

The distribution modelling method allows providing more pertinent information than an "average/standard deviation" pair calculated in the sense of the normal law. This is important for detecting an abnormal combustion such as pre-ignition.

Figure 4:
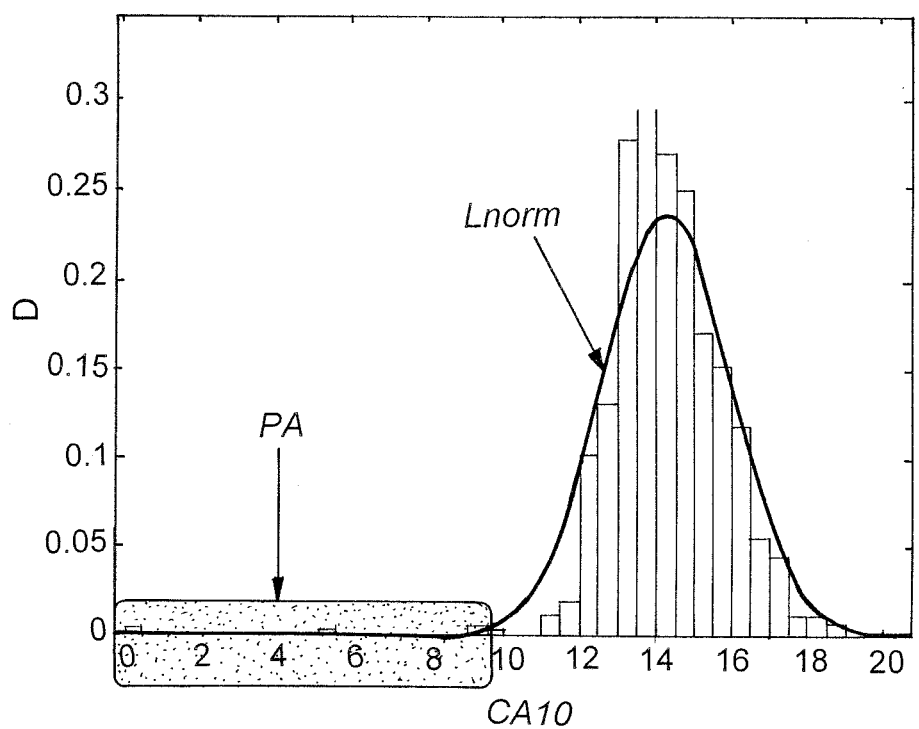
FIG. 4 shows a histogram of CA10 values and a normal law allowing to best adjust to this histogram, in the case of pre-ignition (PA) appearance.

An example of experimental CA10 distribution and of modelling using a normal law (Lnorm) in case of pre-ignition (PA) appearance is given in FIG. 4. It can be seen that the cycles with pre-ignition stretch the distribution towards the lower CA10 values. Consequently, the modelling performed (whether on the basis of a normal law or another) is inevitably distorted by this stretch because it represents in no way a normal combustion.

Modelling normal combustions alone (that is, combustions initiated by the spark of the plug) cannot be performed from the complete sample of N cycles.

Figure 5:
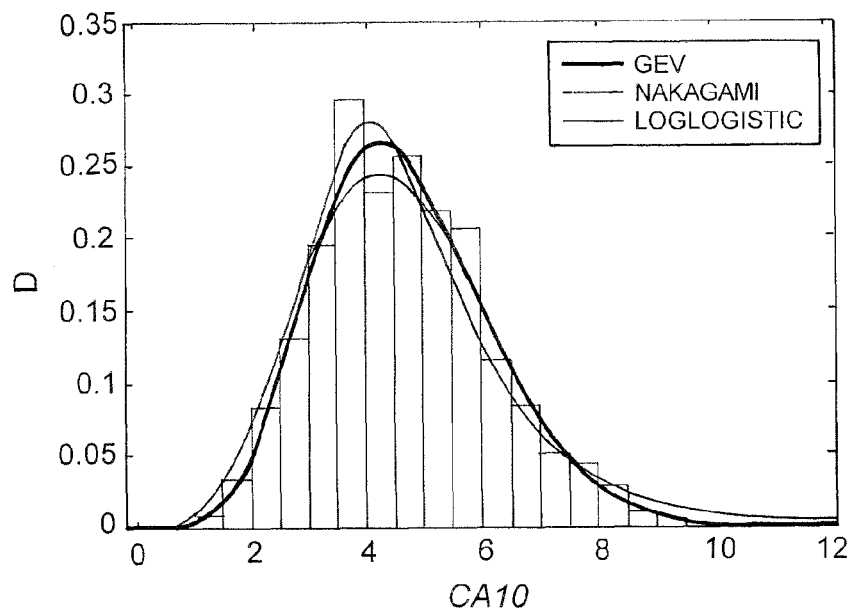
FIG. 5 illustrates the modelling of the CA10 values by means of a non-normal law.

The method according to the invention then allows, from this modelling of the combustion indicator distribution law, quantification of the pre-ignition proportion by following the evolutions of the coefficients of the theoretical distribution laws that are used. The method then comprises the following stages:

1. Removing X CA10 values from among the N values of the distribution to be modelled. The lowest values are preferably removed.
2. Modelling the distribution of the remaining CA10 values through a priori law selection (gamma law, Generalized Extreme Values, Weibull, Nakagami, log-logistic, . . . ), as illustrated in FIG. 5.
3. Removing still other CA10 values from among the N-X CA10 values. The remaining lowest values are preferably removed. The process is repeated thereafter.

An evolution of the coefficients of a theoretical law modelling the distribution of the CA10 values is thus obtained.

Removing the X cycles for which the CA10 values are the lowest amounts to removing from the sample values that potentially correspond to pre-ignitions. After some iterations, the algorithm allows removing all the pre-ignitions and therefore to reach a sample only consisting of combustions normally initiated by the plug. The detection threshold between the pre-ignitions and the normal combustions is thus automatically set by this algorithm.

For example, if a GEV type distribution law is considered, the density function has the general form as follows:

$$f(x, \mu, \sigma, \xi) = \frac{1}{\sigma}\left[1 + \xi\left(\frac{x-\mu}{\sigma}\right)\right]^{(-1/\xi)-1} \exp\left(-\left[1 + \xi\left(\frac{x-\mu}{\sigma}\right)\right]^{-1/\xi}\right)$$

The real coefficients considered thus are:
$\mu \in [-\infty, \infty]$ referred to as "location" coefficient
$\sigma \in [0, \infty]$ referred to as "scale" coefficient
$\xi \in [-\infty, \infty]$ referred to as "shape" coefficient The evolutions of these coefficients during the iterative process show very particular trends. More precisely, when the sample contains pre-ignition or when it does not, the evolution is different. It is therefore judicious to use these evolutions in order to quantify the pre-ignition proportion.

Figure 6:
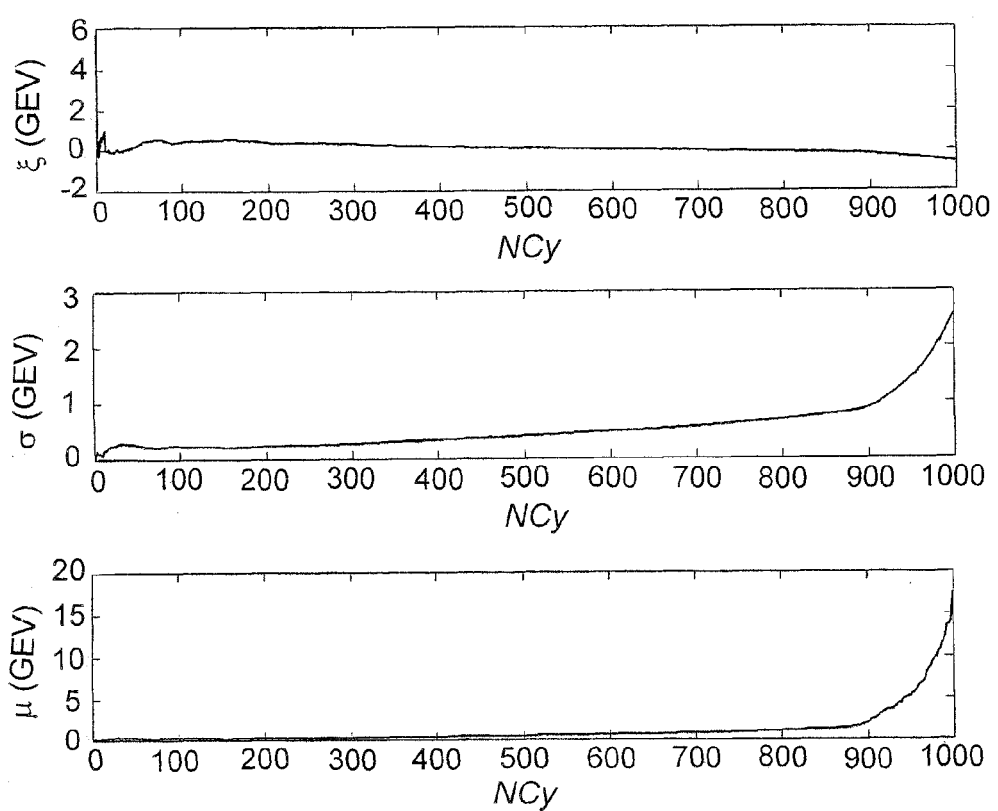
FIG. 6 illustrates the evolution of the coefficients of a GEV law when all the samples are progressively removed from the initial complete data sample.

FIG. 6 illustrates the evolution of the coefficients of a GEV law when all the samples are progressively removed from the complete initial data sample.

In the case of iterative modelling using a GEV law as shown in FIG. 6, it can be noted that coefficients $\sigma$ ("Scale") and $\mu$ ("Location") exhibit very characteristic evolutions. It is thus possible to quantify the pre-ignition frequency from these evolutions, using singular values of these evolution curves, such as maximum values or flex points.

According to another embodiment, the coefficients of the theoretical distribution laws are not used within the scope of the iterative process. It is in fact possible to detect a pre-ignition start appearance as a function of the engine load by applying directly the statistical modellings to various working points, and by comparing directly the coefficient values of the law which is used (whereas, the previous examples were in a stabilized load context).

Figure 13:
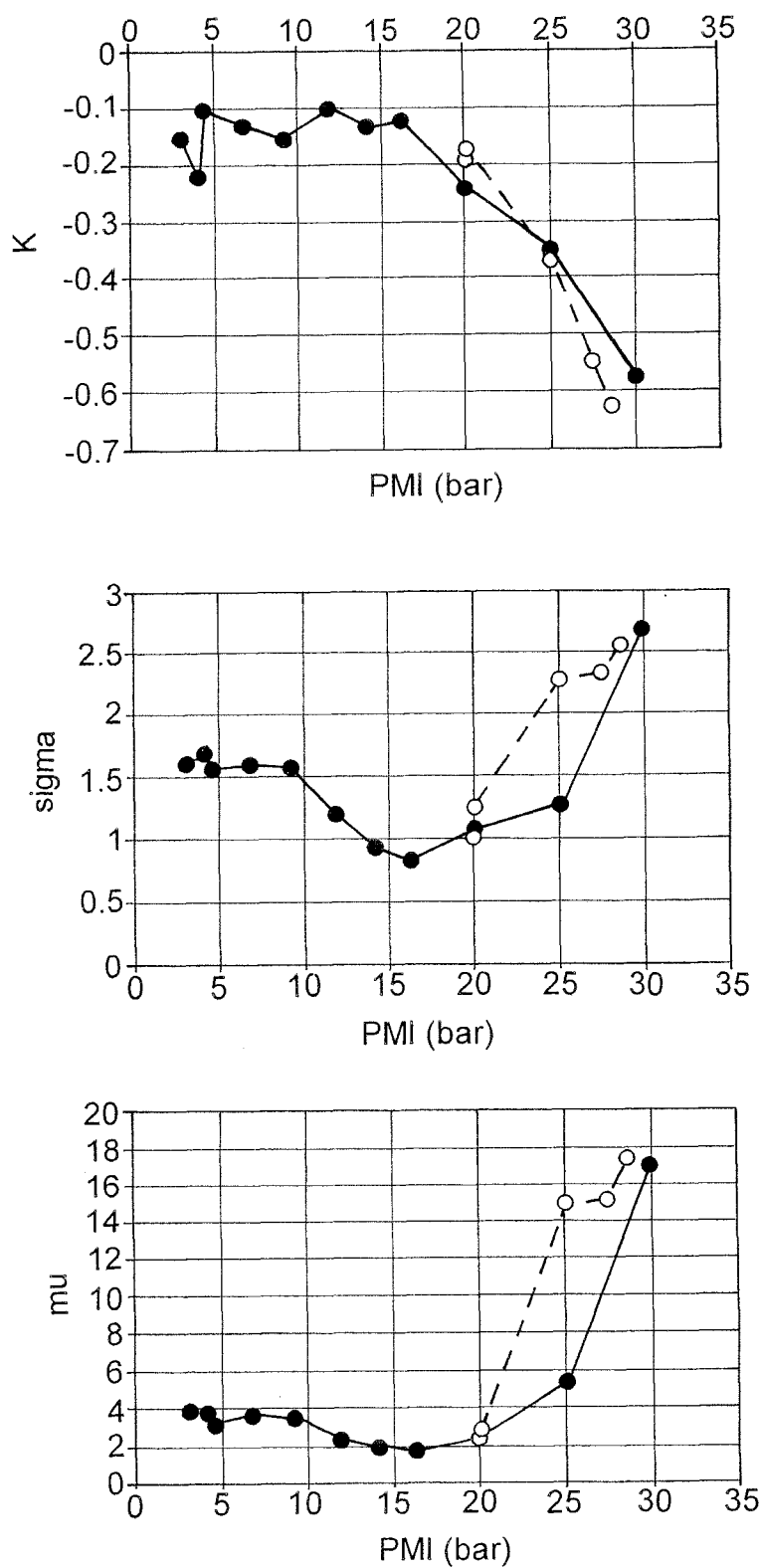
FIG. 13 illustrates the evolution of the GEV law coefficients as a function of the operating load.

FIG. 13 illustrates this comparison with an engine speed isoline (i.e. various points recorded at the same operating speed but at different loads). It allows comparing the values of the coefficients of the GEV law when a model of the distribution of the CA10 of each working point with this particular law (the parameters "k", "sigma" and "mu" is desired that appear in this figure are referred to as "Shape", "Scale" and "Location" in the previous figures). Pre-ignition appearance is again reflected in a particular evolution of these coefficients, in particular in a form of a significant increase of coefficient "mu". The detection methodology with a GEV law thus for example detects this clear increase by considering for example the average value of this coefficient before pre-ignition appears at a lower load as the reference, and exceeding this value by 30% corresponds to a pre-ignition start.

3—Defining Thresholds and Detecting Combustion with Pre-Ignition

According to an embodiment, a threshold is directly defined from a tolerance on the gross value of coefficients ($\mu$, $\sigma$, $\xi$).

Figure 7:
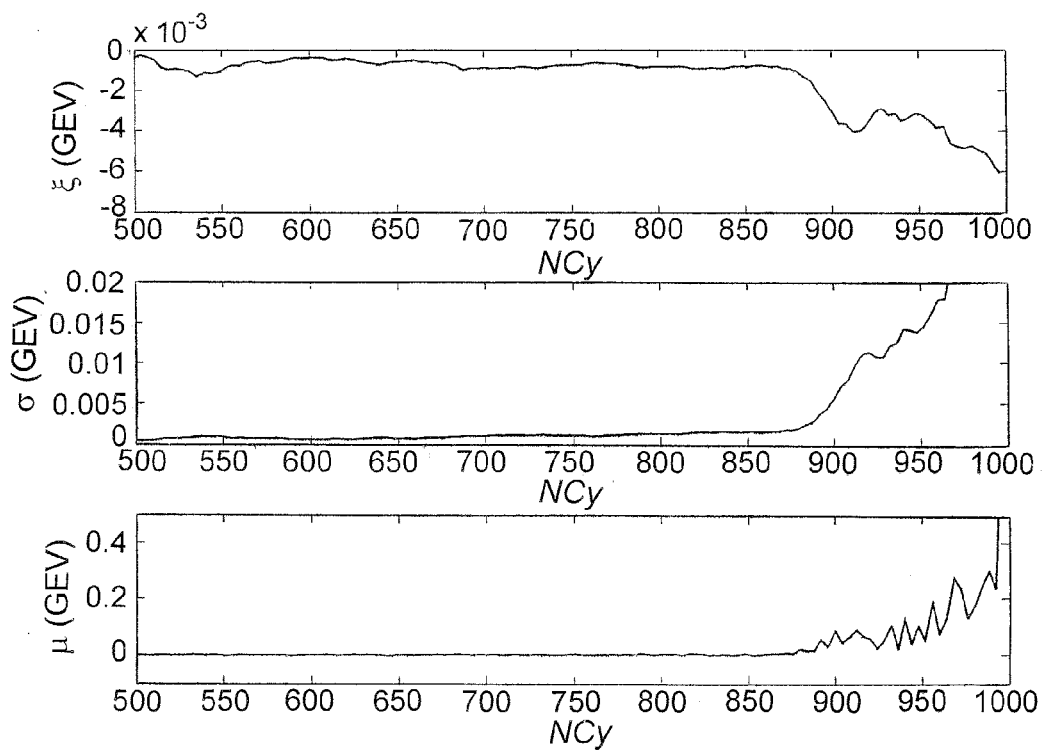
FIG. 7 illustrates the evolution of the first derivatives of the GEV law coefficients as a function of the size of the sample.
Figure 8:
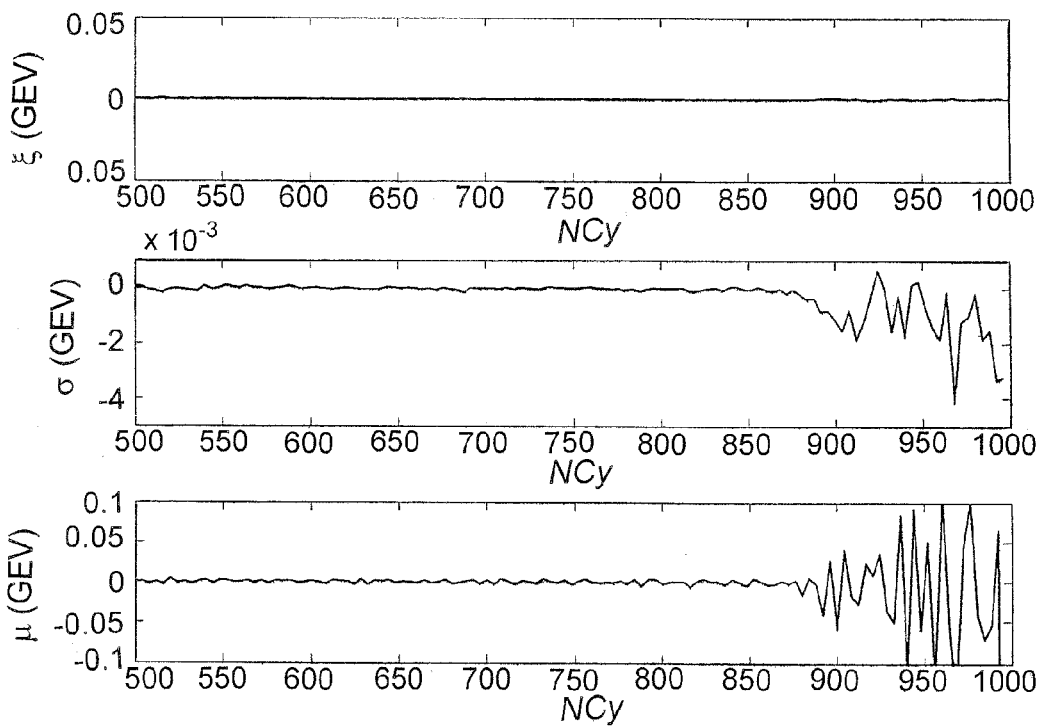
FIG. 8 illustrates the evolution of the second derivatives of the GEV law coefficients as a function of the size of the sample.

According to another embodiment, the first and second derivatives of each coefficient ($\mu$, $\sigma$, $\xi$) are calculated, and maximum and relative variation bounds are set for each derivative. The derivatives of the three coefficients shown in FIG. 6 are illustrated in FIGS. 7 and 8.

Figure 9:
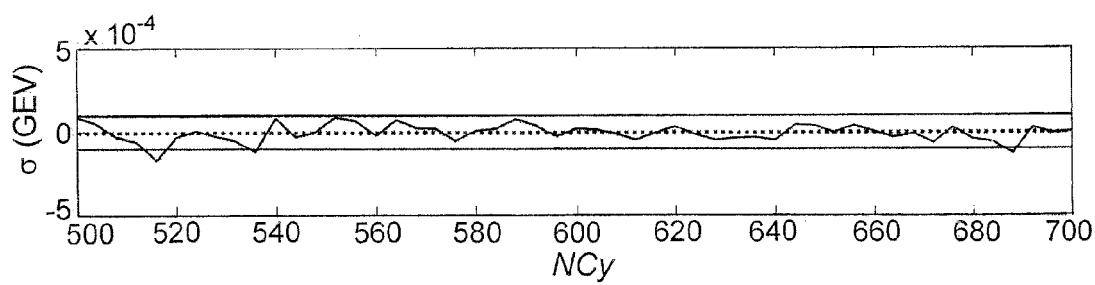
FIG. 9 illustrates the evolution of the second derivative of the "Scale" coefficient of the GEV law (average, average±the standard deviation added)

It is possible to calculate for example on coefficients $\sigma$ ("Scale") and $\mu$ ("Location") the average value of the first and second derivatives over a "well-selected" range and to set the pre-ignition detection threshold to a variation corresponding to 2 times the standard deviation around the average value (illustrated on the second derivative of coefficient $\sigma$ ("Scale") in FIG. 9).

Good selection of the calculation zone selects a zone for which it is known a priori that there is no pre-ignition. In FIG. 9 for example, the average value and the standard deviation of coefficient $\sigma$ ("Scale") of the GEV law is characterized over a range of 200 cycles only, thus avoiding the disturbances:

linked with potential pre-ignitions (a comfortable margin is taken by considering that the 300 cycles having the lowest CA10 should not be used, considering that it is extremely rare to have 300 cycles with pre-ignition with an acquisition of only 1000 cycles), and those linked with the modelling convergence failures when the modelled sample does not contain a sufficient amount of data (sample size less than 200 cycles for example).

It is also possible to determine an average pre-ignition appearance frequency by analyzing separately each coefficient and by working out the average of the number of pre-ignitions determined separately by each one of the coefficients, so as to have an average indicator of the pre-ignition amount.

Figure 10:
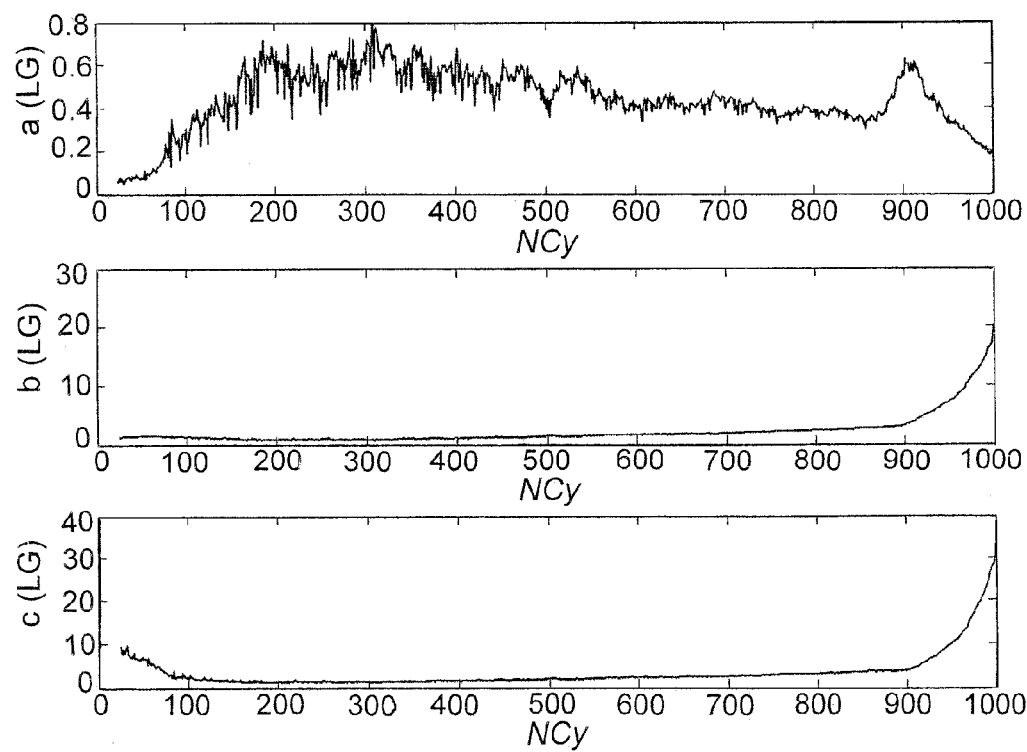
FIG. 10 illustrates the evolution of the coefficients of the GG law as a function of the size of the sample.
Figure 11:
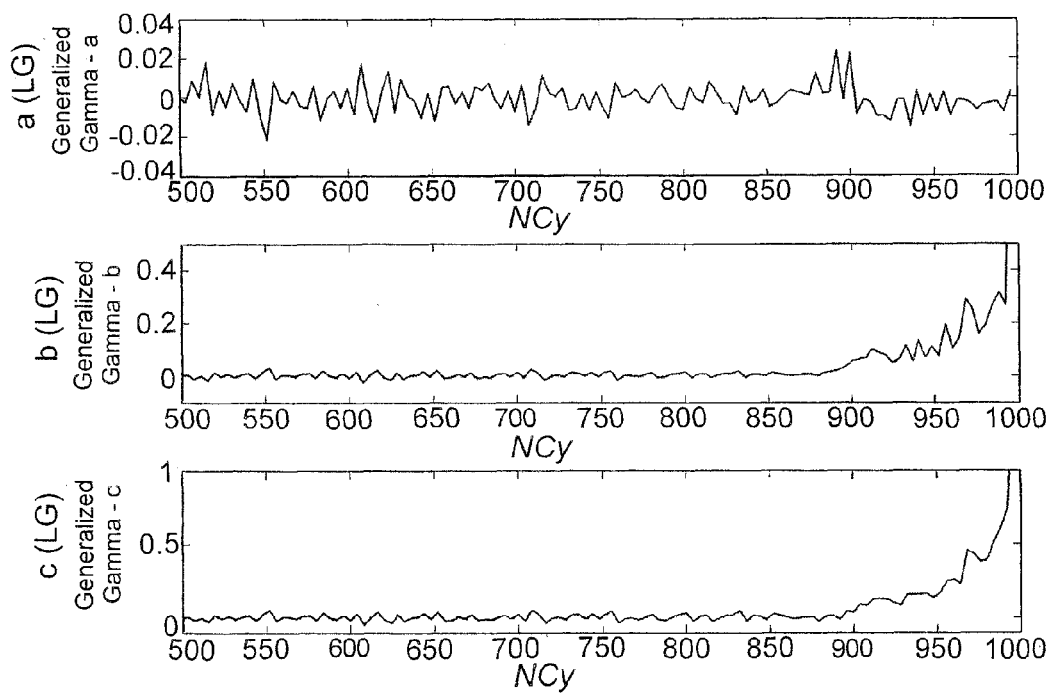
FIG. 11 illustrates the evolution of the first derivatives of the generalized Gamma law coefficients as a function of the size of the sample.
Figure 12:
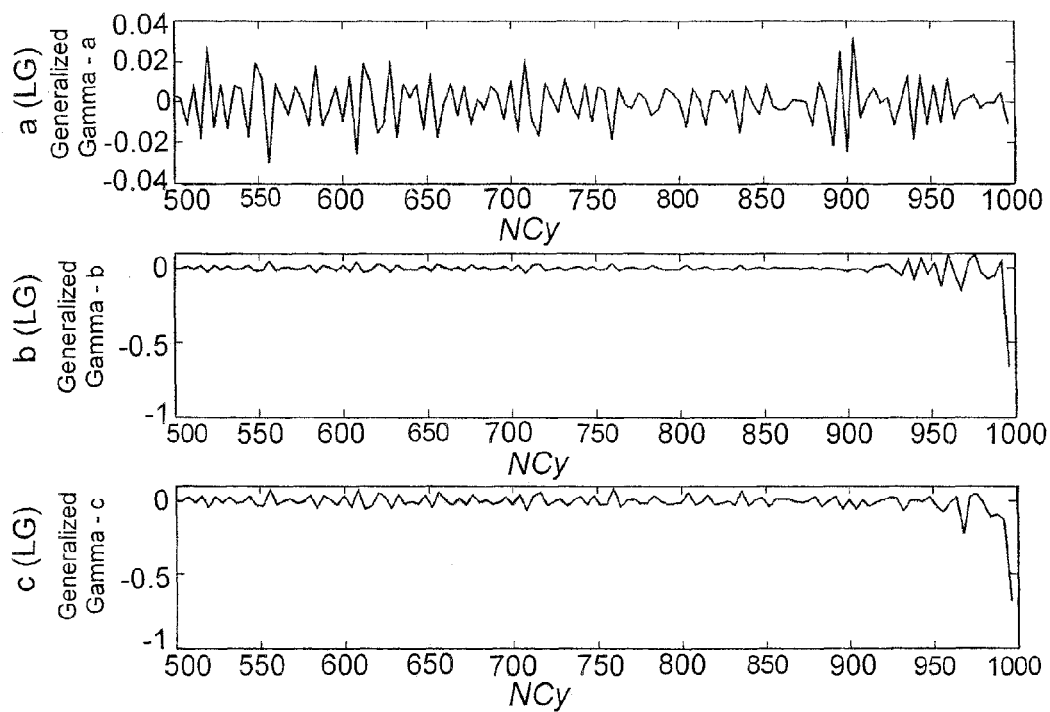
FIG. 12 illustrates the evolution of the second derivatives of the generalized Gamma law coefficients as a function of the size of the sample.

FIG. 10 illustrates the evolutions of the coefficients of a generalized Gamma law (LG) with the same iterative process. Once again, the coefficients exhibit a particular evolution when the cycles assumed to be pre-ignitions are removed from the complete initial sample (coefficients "b" and "c" are very clearly stabilized when a hundred cycles have been removed from the initial sample, and coefficient "a" also follows a particular evolution since it reaches a maximum value when all the pre-ignitions have been removed). FIGS.

11 and 12 illustrate the evolutions of the first and second derivatives of these coefficients for the generalized Gamma law.

4—Abnormal Combustion Control

By this comparison, the engine controller/calculator can detect the start of an abnormal combustion of "rumble" or "pre-ignition" type in the combustion chamber.

In case of abnormal combustion, this controller/calculator then launches the actions required for control of this combustion in order to avoid the continuation of such combustion.

What is referred to as abnormal combustion control is the possibility of controlling the progress of this combustion in order to avoid sudden destructive pressure increases, as well as the possibility of completely stopping such a combustion, through smothering for example.

This combustion control is preferably carried out by fuel re-injection at a predetermined crank angle through injection nozzles 18. More precisely, the controller/calculator controls valves 20 in such a way that the injection nozzle of the cylinder concerned allows an amount of fuel to be fed into the combustion chamber in liquid form. The amount of fuel re-injected depends on the composition of the engine and it can range between 10% and 200% of the amount of fuel initially fed into this combustion chamber. The re-injected fuel is therefore used to counter the flame that starts spreading in case of abnormal combustion. This re-injection allows either blowing out this flame or to smother it by increasing the fuel/air ratio of the fuel mixture. Furthermore, the fuel injected in liquid form uses the heat present around this flame to vaporize and the temperature conditions around the flame decrease, thus retarding combustion of the fuel mixture and notably its auto-ignition.

After this fuel injection, the pressure in the cylinder increases, but less suddenly. This pressure thereafter decreases and reaches a level compatible with the pressure level of a conventional combustion.

This mechanism prohibits any development of an abnormal combustion with a high combustion rate and high pressures. Of course, the means designed to control abnormal combustion are used in each cycle during which such a combustion is detected by the controller/calculator.

The actions of the method as described above can be combined with other, slower actions, such as throttle closure, to prevent the pressure conditions in the combustion chamber from promoting an abnormal combustion in the next cycles.

5—Other Embodiments

The invention allows using other measurements than the cylinder pressure, such as the instantaneous torque, the instantaneous engine speed, the vibration level (accelerometric detectors), ionization signal, etc.

The invention can also use other combustion indicators:

from the cylinder pressure: MIP, maximum cylinder pressure, crank angle at maximum pressure, CAxx, maximum energy release, from the instantaneous torque: maximum torque, maximum torque derivative, from the instantaneous engine speed: maximum speed, maximum acceleration, the volume of the combustion chamber, or the volume gradient at certain times (CA10 for example).

The invention is not limited to the use of a single combustion indicator. In fact, it may be advantageous to simultaneously combine several ones of these indicators. In current methods, such indicators are always analyzed separately.

To analyze simultaneously values of several indicators of the state of progress of the combustion (CA10, MIP), several indicators are combined so as to obtain other indicators allowing to distinguish more rapidly and more efficiently normal combustions and abnormal combustions such as pre-ignition.

Judicious selection of the indicators to be combined ($CA_{10}$, maximum cylinder pressure, maximum cylinder pressure derivative, . . . ) allows to obtain indicators referred to as "reduced indicators", denoted by $X_1, X_2, \ldots, X_n$, which exhibit, in the case of normal combustions, much lower dispersions than the direct indicators $x_1, x_2, \ldots, x_n$. It is also possible to "erase" the natural dispersion associated with combustion while keeping the same pre-ignition sensitivity.

A dimension reduction is thus performed (an indicator defines a dimension) so as to best exploit the relations between the various indicators.

To carry out this dimension reduction, the directions of space (x1, x2, . . . , xn) that best represent the correlations between the various quantities are sought. The hypothesis that motivates this approach is that abnormal combustions of pre-ignition type have a combustion mode that differs in some respects from the one followed by a normal combustion. In other words, one or more characteristics of these pre-ignitions show a discontinuity allowing distinguishing them from the other normal combustions. Showing the correlations between various indicators allows more readily highlighting these combustion mode changes.

According to a first embodiment, the correlations between various indicators are sought by means of a regression between the indicators.

Figure 14:
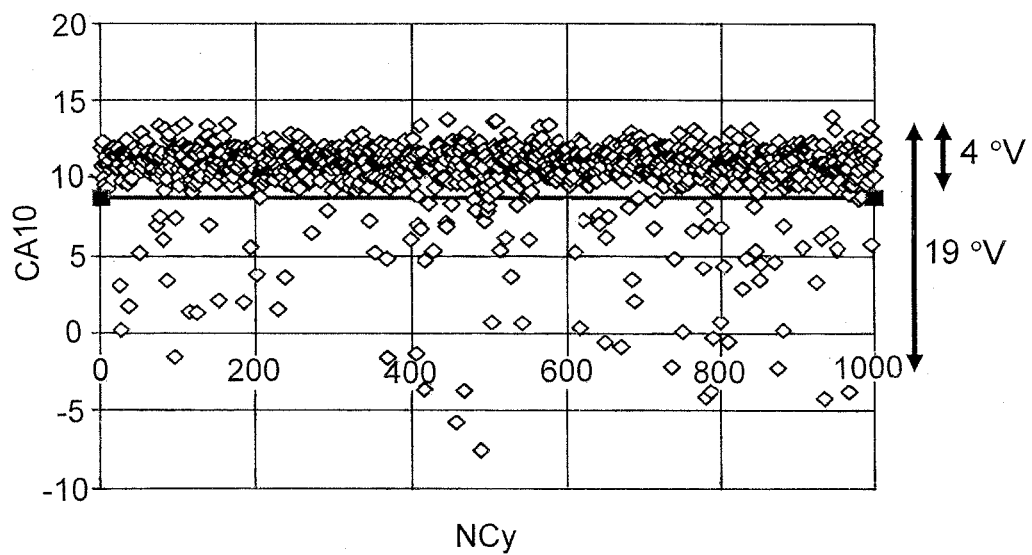
FIG. 14 is an example of evolution of the combustion initiation delay over an acquisition of 1000 cycles.

FIG. 14 illustrates the evolution of CA10 during an acquisition of 1000 engine cycles under stabilized running conditions. The dispersion associated with normal combustions is of the order of 4° crank angle degrees. We can also observe that the pre-ignitions deviate from the average of the CA10 values at the maximum by about 19 crank angle degrees (19°V).

Figure 15:
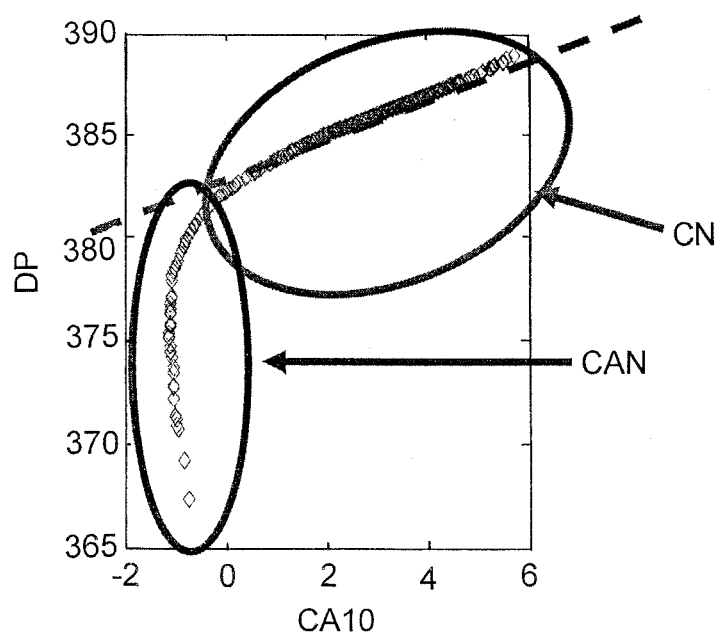
FIG. 15 illustrates the CA10 vs. angular derivative of the pressure at CA=CA10.

FIG. 15 shows the same sample of points in a CA10/DP plane, DP being the angular pressure derivative when the crank angle is equal to angle CA10. This representation allows seeing that a linear relation connects these two variables in the case of normal combustions (CN), whereas the abnormal combustions (CAN) deviate very clearly from this trend. The dotted line in FIG. 15 illustrates the line of linear regression between the two combustion indicators CA10 and DP for normal combustions (CN). The idea thus is to combine these two indicators so as to extract therefrom a third one, potentially more interesting, in order to discriminate more easily abnormal combustions from normal combustions.

Figure 16:
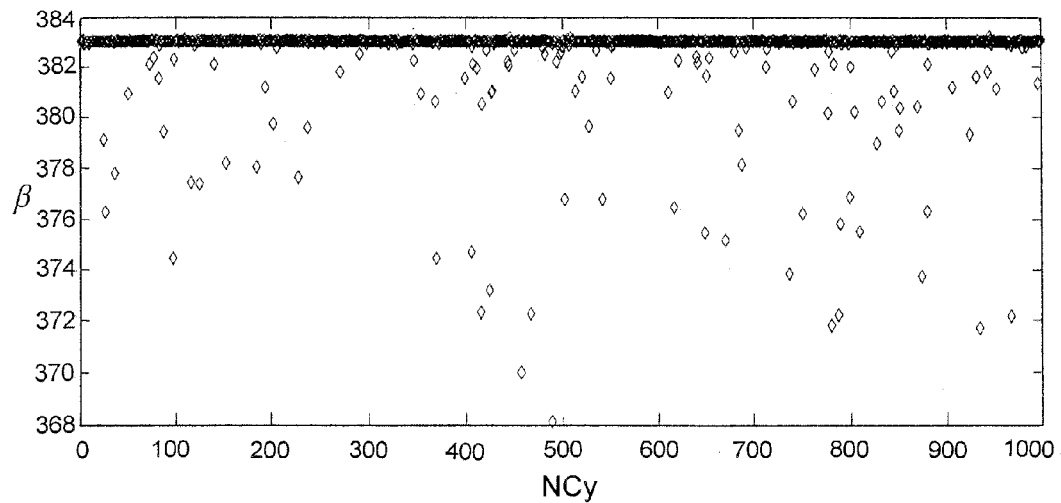
FIG. 16 illustrates the evolution of the "reduced" quantity beta over an acquisition of 1000 cycles.

It is possible for example to use as the third indicator, converted or combined indicator, variable β defined by the error between the regression and CA10:

$$\beta = CA10 - (\alpha.DP + \gamma)$$

where ($\alpha.DP+\gamma$) is the line of linear regression between CA10 and DP for normal combustions (CN). FIG. 16 shows the evolution of variable β for the 1000 engine cycles (Ncy). It can be noted that the dispersion associated with normal combustions is below 0.5 crank angle degrees, whereas the pre-ignitions still remain potentially far from the average of the values of β. This variable change thus allows to greatly tighten up the normal dispersion and thus to identify abnormal combustions more precisely.

According to a second embodiment, the correlations between various indicators are sought by a principal component analysis with the new indicators corresponding to the principal components. Correlated indicators are thus converted to new indicators, independent of one another. These converted indicators allow best explaining the variability of the non-converted indicators.

Principal Component Analysis is a factor analysis of the multivariate data analysis family, which converts variables related to one another (correlated variables) to new variables independent of one another. This technique allows reducing the information to a more limited number of components than the initial number of variables. These components allow best explaining the variability (variance) of the data, i.e. to "pick up" a maximum amount of information.

Several degrees of freedom can be used to optimize the method:
the number of indicators used;
the selection of the indicators to be used; and
the reduction method used to identify the correlations between the indicators selected (PCA for example).

Figure 17:
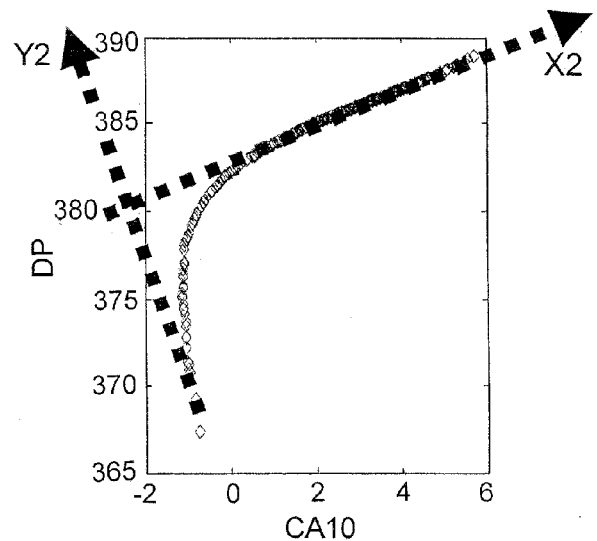
FIG. 17 illustrates the CA10 vs. angular derivative of the pressure at CA=CA10.
Figure 18:
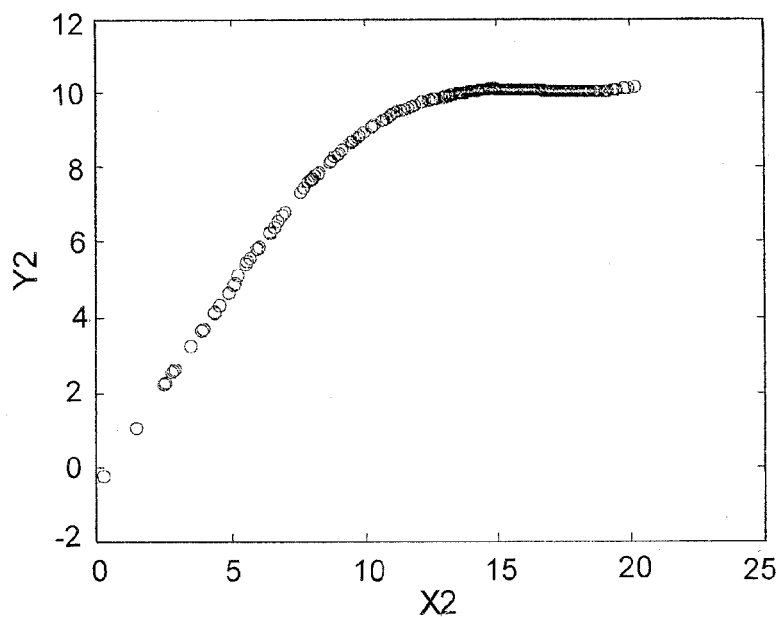
FIG. 18 illustrates Y2 as a function of X2, the projection of the cycles in the reference frame obtained from the principal directions identified in frame CA10, DP.
Figure 19:
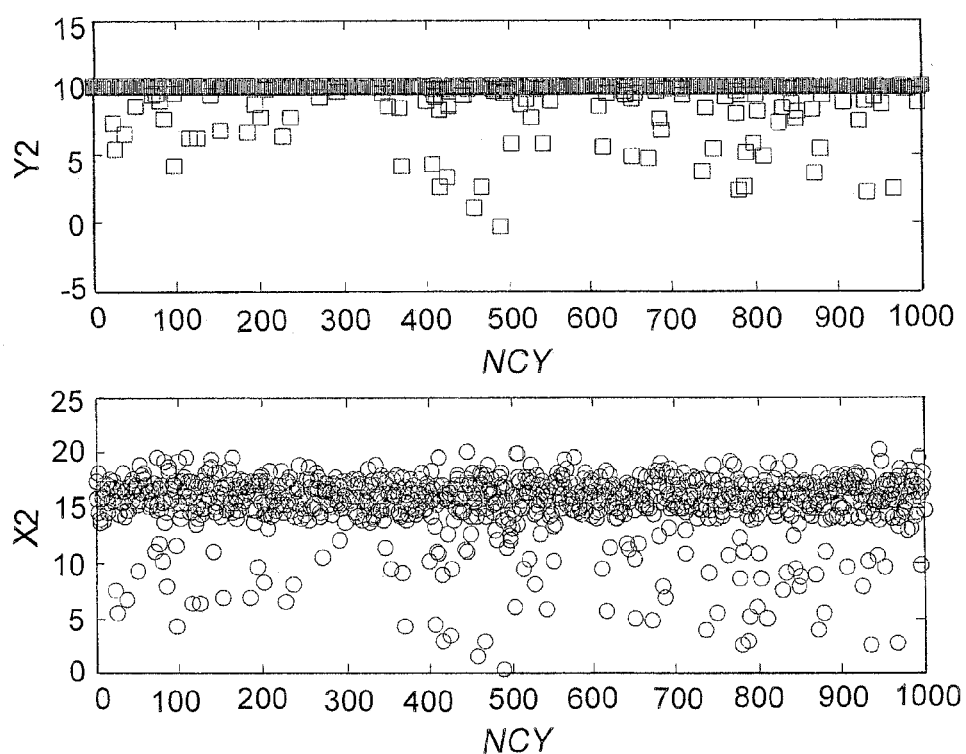
FIG. 19 illustrates Y2 (top) and X2 (bottom) for each sample.

FIGS. 17 to 19 allow illustration of a simple example in the case of processing of the data acquired at the engine test bench.

A reference frame change is performed, by defining by PCA two new axes (principal components) X2 and Y2 (X2 being "carried" by the linear and dense zone of the normal combustions, X2 and Y2 being orthogonal), diagrammatically shown in FIG. 17. The representation of the same sample of points in the frame X2,Y2 is shown in FIG. 18.

The principal components (axes) are then analyzed to differentiate the pre-ignitions from the abnormal combustions. The evolutions of these components can be seen in FIG. 19 (Y2 at the top, X2 at the bottom). It can be seen, as in FIG. 16, that the pre-ignitions keep the same "dynamics" in relation to normal combustions which are much denser. On the other hand, it is much simpler and direct to define normal combustions and pre-ignition, given that the normal combustions are all very dense.

According to this embodiment, after determining these new indicators, the evolution of at least one coefficient of the theoretical laws modelling the dispersion of these new indicators is analyzed.

The invention claimed is:

1. A method for controlling combustion of a spark-ignition internal-combustion engine, wherein at least one signal representative of a state of the combustion is recorded by at least one detector in the engine, and at least one indicator of the combustion at each engine cycle is determined from the signal for each engine cycle comprising:
modelling a distribution of N combustion indicator values acquired over N cycles preceding a cycle in progress, by determining coefficients of a theoretical distribution law;
repeating the modeling by removing values from among the N combustion indicator values or repeating the modeling for working points of the engine, to obtain an evolution of coefficients;
determining at least one parameter representing an evolution of at least one of the coefficients;
determining a frequency of abnormal combustions occurring during the N cycles preceding the cycle in progress by comparing the at least one parameter with a threshold; and
controlling a course of the abnormal combustion detected in the combustion chamber.

2. A method as claimed in claim 1, wherein, prior to modeling a distribution, the at least one indicator is converted to at least one new indicator, for which a distribution of N values acquired over N cycles preceding the cycle in progress exhibits, for normal combustions, a lower dispersion than the non-converted indicators.

3. A method as claimed in claim 1, wherein the indicator is the crank angle where 10% of the energy which is introduced has been released.

4. A method as claimed in claim 3, wherein, prior to modeling a distribution, the at least one indicator is converted to at least one new indicator, for which a distribution of N values acquired over N cycles preceding the cycle in progress exhibits, for normal combustions, a lower dispersion than the non-converted indicators.

5. A method as claimed in claim 1, wherein the at least one signal is a continuous pressure measurement within the cylinder.

6. A method as claimed in claim 5, wherein, prior to modeling a distribution, the at least one indicator is converted to at least one new indicator, for which a distribution of N values acquired over N cycles preceding the cycle in progress exhibits, for normal combustions, a lower dispersion than the non-converted indicators.

7. A method as claimed in claim 5, wherein the indicator is the crank angle where 10% of the energy which is introduced has been released.

8. A method as claimed in claim 7, wherein, prior to modeling a distribution, the at least one indicator is converted to at least one new indicator, for which a distribution of N values acquired over N cycles preceding the cycle in progress exhibits, for normal combustions, a lower dispersion than the non-converted indicators.

9. A method as claimed in claim 1, wherein the threshold is directly defined from a tolerance on a gross value of coefficients.

10. A method as claimed in claim 9, wherein, prior to modeling a distribution, the at least one indicator is converted to at least one new indicator, for which a distribution of N values acquired over N cycles preceding the cycle in progress exhibits, for normal combustions, a lower dispersion than the non-converted indicators.

11. A method as claimed in claim 9, wherein the indicator is the crank angle where 10% of the energy which is introduced has been released.

12. A method as claimed in claim 11, wherein, prior to modeling a distribution, the at least one indicator is converted to at least one new indicator, for which a distribution of N values acquired over N cycles preceding the cycle in progress exhibits, for normal combustions, a lower dispersion than the non-converted indicators.

13. A method as claimed in claim 9, wherein the at least one signal is a continuous pressure measurement within the cylinder.

14. A method as claimed in claim 13, wherein, prior to modeling a distribution, the at least one indicator is converted to at least one new indicator, for which a distribution of N values acquired over N cycles preceding the cycle in progress exhibits, for normal combustions, a lower dispersion than the non-converted indicators.

15. A method as claimed in claim 13, wherein the indicator is the crank angle where 10% of the energy which is introduced has been released.

16. A method as claimed in claim 15, wherein, prior to modeling a distribution, the at least one indicator is converted to at least one new indicator, for which a distribution of N values acquired over N cycles preceding the cycle in progress exhibits, for normal combustions, a lower dispersion than the non-converted indicators.

17. A method as claimed in claim 1, wherein the threshold is defined by calculating first and second derivatives of each one of the coefficients, and maximum and relative variation bounds are fixed for the first and second derivatives.

18. A method as claimed in claim 17, wherein, prior to modeling a distribution, the at least one indicator is converted to at least one new indicator, for which a distribution of N values acquired over N cycles preceding the cycle in progress exhibits, for normal combustions, a lower dispersion than the non-converted indicators.

19. A method as claimed in claim 17, wherein the indicator is the crank angle where 10% of the energy which is introduced has been released.

20. A method as claimed in claim 19, wherein, prior to modeling a distribution, the at least one indicator is converted to at least one new indicator, for which a distribution of N values acquired over N cycles preceding the cycle in progress exhibits, for normal combustions, a lower dispersion than the non-converted indicators.

21. A method as claimed in claim 17, wherein the at least one signal is a continuous pressure measurement within the cylinder.

22. A method as claimed in claim 21, wherein, prior to modeling a distribution, the at least one indicator is converted to at least one new indicator, for which a distribution of N values acquired over N cycles preceding the cycle in progress exhibits, for normal combustions, a lower dispersion than the non-converted indicators.

23. A method as claimed in claim 21, wherein the indicator is the crank angle where 10% of the energy which is introduced has been released.

24. A method as claimed in claim 23, wherein, prior to modeling a distribution, the at least one indicator is converted to at least one new indicator, for which a distribution of N values acquired over N cycles preceding the cycle in progress exhibits, for normal combustions, a lower dispersion than the non-converted indicators.

25. A method as claimed in claim 1, wherein an average frequency of pre-ignition appearance is determined by separately analyzing each of the coefficients and by separately calculating an average of a number of pre-ignitions by each of the coefficients.

26. A method as claimed in claim 25, wherein, prior to modeling a distribution, the at least one indicator is converted to at least one new indicator, for which a distribution of N values acquired over N cycles preceding the cycle in progress exhibits, for normal combustions, a lower dispersion than the non-converted indicators.

27. A method as claimed in claim 25, wherein the indicator is the crank angle where 10% of the energy which is introduced has been released.

28. A method as claimed in claim 27, wherein, prior to modeling a distribution, the at least one indicator is converted to at least one new indicator, for which a distribution of N values acquired over N cycles preceding the cycle in progress exhibits, for normal combustions, a lower dispersion than the non-converted indicators.

29. A method as claimed in claim 25, wherein the at least one signal is a continuous pressure measurement within the cylinder.

30. A method as claimed in claim 29, wherein, prior to modeling a distribution, the at least one indicator is converted to at least one new indicator, for which a distribution of N values acquired over N cycles preceding the cycle in progress exhibits, for normal combustions, a lower dispersion than the non-converted indicators.

31. A method as claimed in claim 29, wherein the indicator is the crank angle where 10% of the energy which is introduced has been released.

32. A method as claimed in claim 31, wherein, prior to modeling a distribution, the at least one indicator is converted to at least one new indicator, for which a distribution of N values acquired over N cycles preceding the cycle in progress exhibits, for normal combustions, a lower dispersion than the non-converted indicators.

* * * * *